US006209182B1

(12) United States Patent
Fröhlich

(10) Patent No.: US 6,209,182 B1
(45) Date of Patent: Apr. 3, 2001

(54) APPARATUS FOR SEPARATING CYLINDRICAL PIPES PUSHED INTO ONE ANOTHER

(76) Inventor: Ludwig Fröhlich, Jesuitenstrasse 2, D-97337 Dettelbach (DE)

(*) Notice: Subject to any disclaimer, the term of this patent is extended or adjusted under 35 U.S.C. 154(b) by 0 days.

(21) Appl. No.: 09/398,526

(22) Filed: Sep. 16, 1999

(30) Foreign Application Priority Data

Sep. 18, 1998 (DE) ............................................ 198 42 768

(51) Int. Cl.[7] ...................................................... B23P 19/04

(52) U.S. Cl. ................................ 29/239; 29/271; 29/272; 269/43

(58) Field of Search ............................ 29/239, 242, 243, 29/255, 263, 267, 268, 280, 282, 278

(56) References Cited

U.S. PATENT DOCUMENTS 3,653,115 * 4/1972 Perkins .................................. 29/272
4,413,415 * 11/1983 Stovall .................................. 269/43
4,750,662 * 6/1988 Kagimoto .............................. 29/272
4,893,393 * 1/1990 Marshall ............................... 269/43
5,865,430 * 2/1999 Conover et al. ....................... 269/43

* cited by examiner

*Primary Examiner*—David A. Scherbel
*Assistant Examiner*—Lee Wilson
(74) *Attorney, Agent, or Firm*—Edwin D. Schindler

(57) ABSTRACT

Set for separating cylindrical pipes pushed into one another in an axial direction, in particular discharge pipes, said set having at least one gripper, which has two grabbing arms that extend azimuthally and a clamping device. The gripper is connected to a lever with a component extending in a radial direction, whereby on gripper (5), pointing in an axial direction, a web (4) that extends azimuthally is integrally moulded, the web rising in the manner of a flank in the azimuthal region (2*a* and 2*b*). A second gripper (6) with at least two grabbing arms (3) and a clamping device (8) is provided and the gripper is connected to lever (7) with a component extending in a radial direction, on the second gripper (6) a nose (1*a* and 1*b*) that extends radially is integrally moulded, the nose being disposed in the axial region of a rising flank (2*a* and 2*b*) of the web (4) and projecting beyond the web (4) radially.

20 Claims, 3 Drawing Sheets

Figure 1:
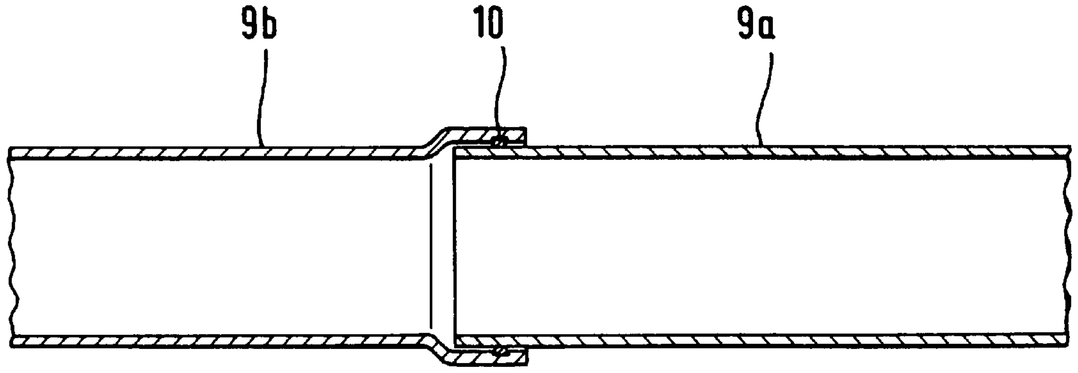

Fig. 4
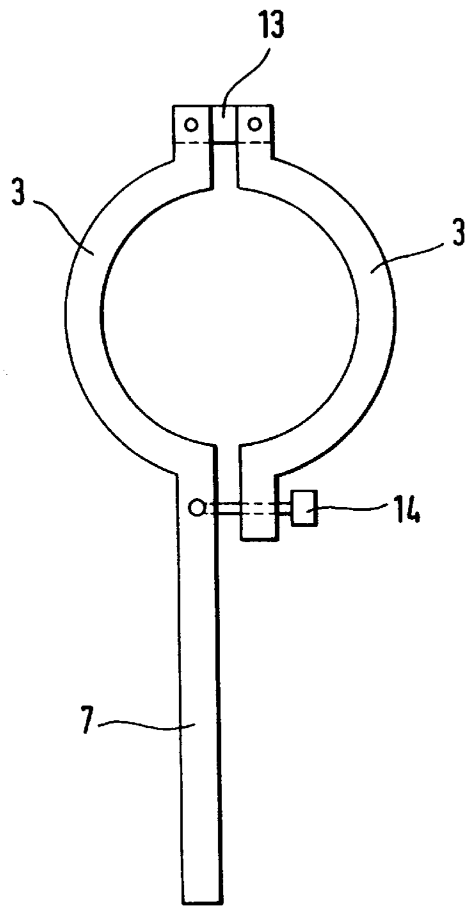
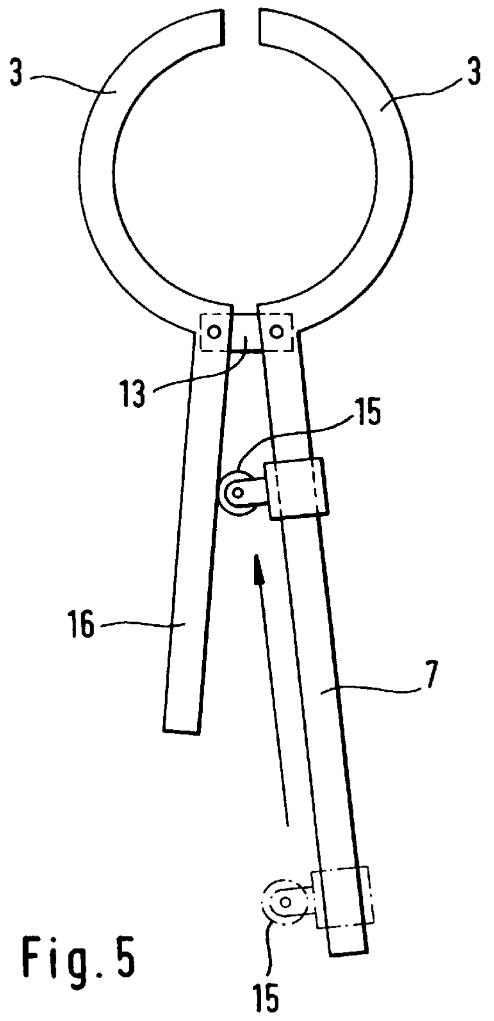
Fig. 5
Fig. 6
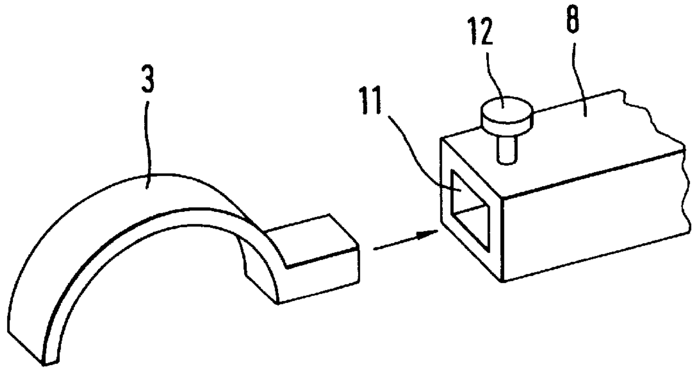

APPARATUS FOR SEPARATING CYLINDRICAL PIPES PUSHED INTO ONE ANOTHER

BACKGROUND OF THE INVENTION

1. Technical Field of the Invention

The invention concerns a set for separating cylindrical pipes pushed into one another in an axial direction, in particular discharge pipes, said set having at least one gripper, which has two grabbing arms that extend azimuthally and a clamping device, and said gripper is connected to a lever with a component extending in a radial direction.

2. Description of the Prior Art

In installation practice, pipes are often fitted into one another in a longitudinal direction and sealed off against one another by means of rubber gaskets. To facilitate easy assembly and adjustment without high energy expenditure, pipes and seal are greased in advance with a lubricant or slip agent, which, as long as it is moist, allows the pipes to be pulled apart with relatively little energy if assembly is defective or to subsequently change the pipe location. However, if the lubricant is dry the two pieces of pipe can only be separated using considerable energy so that damage cannot be ruled out. Here the dry rubber gasket acts to brake sliding, which makes is it significantly more difficult to pull the pipes apart. A second person is required to hold the pipe steady. But even if the lubricant is still moist the pipes may stick together, favoured by the penetration of dirt, sand stone dust and similar, so that it is no longer possible to separate the pipes with conventional aids without destroying them.

If the transferable power generated by bear hands is insufficient, the use of a gripper is conceivable, which grips the pipe via two grabbing arms and is connected to a lever, which enables the transmission of high torque to the pipe so that the fit of the pipes can be loosened through a relative twisting of one pipe in relation, to another Particularly suitable for this purpose are pipe wrenches. However, the axial transmission of force required to loosen the pipes is hardly possible or impossible by means of a pipe wrench and, owing to the high forces acting upon the pipes via the lever, the probability of damage is high.

SUMMARY OF THE INVENTION

By way of contrast the invention has the object of providing a set of the kind described at the beginning, which allows relatively easy separation of the assembled pipes, which are possibly stuck together, with little application of force and consumption of time, and as far as possible in a non-destructive manner.

The task is solved by the inventive device in that on the gripper, pointing in an axial direction, a web that extends azimuthally is integrally moulded, said web rising in the manner of a flank in the azimuthal region. A second gripper with at least two grabbing arms and a clamping device is provided and said gripper is connected to a lever with a component extending in a radial direction. On the second gripper a nose that extends radially is integrally moulded, said nose being disposed in the axial region of a rising flank of the web and projecting beyond said web.

The basic idea of the invention is as follows: initially, with the aid of a second gripper with lever, the pipe that is not to be removed is fixed. It can therefore no longer twist so that on the one hand the probability of damage is decreased and on the other the transmission of force to the pipe to be removed is more effective. Furthermore, the nose, interworking with the web, causes the two grippers, and thus also the pipes, to be pressed apart, when twisted relatively to each other, in an axial direction and thus separated. This functions as follows: initially, one of the grippers is affixed to the pipe to be removed and the other gripper to the pipe connected thereto by attaching the grabbing arms via the respective clamping device. Within the meaning of the invention, a clamping device is understood to be a device that connects the grabbing arms to each another and to the lever and enables the grabbing arms to be pressed against the pipe. Now, the grippers are twisted in a mutually opposing direction of rotation about the joint longitudinal ax of the pipes through tile application of force upon the levers, until the nose bears against a rising flank of a web disposed on the other gripper. When the grippers are twisted further relatively to each other, the nose slides along the flank of the web so that due to the axial rising the two grippers and thus also the pipes connected to each other are pressed apart from each other in an axial direction. In this way, with the relatively small application of force a large axial force component can be transmitted to the two pipes, without, as is the case, for example, with the use of a single gripper, the occurrence of high transverse forces, which not only increase the force expenditure but can also cause the destruction of the pipes. The pipes are pulled apart by the inventive set under a relatively low expenditure of force and can be separated without destruction. Thereby both grippers can also possibly be operated by one person, a second person is no longer required to hold the pipe steady.

In an advantageous embodiment, the clamping device of at least one of the two grippers has a locking arrangement that guarantees that both grippers must no longer be simultaneously both tensioned and turned. The loosening of a pipe connection is made considerably more easy and can be effected by only one person.

One gripper of the inventive set can also be used on pipes extending in wall recesses if the side on which both grabbing arms open lies opposite radially to the respective lever. Thus both arms can be inserted via the lever from outside into the wall slot and pushed on to the pipe. After closing the clamping device, the grabbing arms bear against the pipe, and the gripper can be turned by applying force upon the lever.

Affixing the grabbing arms to the pipe, in the same way as pincers, can be achieved via two limbs. The limbs are connected to each other via an axis so as to be articulated and by swiveling in relation to each other press the grabbing arms against the pipe. The lever, which serves to transmit the turning effort, is attached to the limb.

Alternatively or supplementary thereto, a tightening bolt is conceivable, which when tightened presses the grabbing arms against the pipe. Owing to the frictional forces, the clamping device is locked without additional measures.

To ensure that the grabbing arms are pressed as firmly as possible and, to avoid high point-to-point forces acting upon the pipe, as evenly as possible, the clamping device applies a clamping force to the grabbing arms at their two ends in relation to each other. It is conceivable, for example, that the grabbing arms at their ends are connected to each other via respectively one tightening boll. By tightening these bolts, the grabbing arms are affixed to the pipe. Owing to the fact that the two bolts can be adjusted independently of each other, the clamping forces can be distributed equally across the circumference of the pipe.

The grippers of the inventive set can be used especially effectively if their grabbing arms are adapted to the respective diameter of the pipes to be separated. However, in order that a separate set is not required for every common pipe thickness, the grabbing arms are preferably connected to the clamping device so as to be releasable and therefore can be exchanged as required. By way of contrast other components of the gripper can be used independently of the respective pipe size.

A decisive objective of the inventive set is the effective transmission of torque to pipes without causing damage, which can occur, for example, when the contact pressure is too high. For this reason, in a preferred embodiment, the grabbing arms of at least one of the grippers are provided with a coating on the radial inner sides, which bear flat against the pipe and thus enable a maximum transmission of torque.

The grip can be further improved via a suitable structuring of the radial inner sides of the grabbing arms. Suitable for this purpose are especially knob or groove structures.

Pipes that are to be separated are often not accessible from all directions. In order that both grippers of the set can be applied to such a pipe connection, the levers should be disposed so that they extend, when the nose bears against a rising flank of the web, in essentially the same direction. Thus access to the two pipes from one side is sufficient to transfer torque from there to both grippers via the respective lever.

The force developed between the nose and the rising flank, directed in the axial direction of the pipes, generally only acts on one radial side of the pipe connection and can therefore, if due to the uneven effect of the force the pipes wedge in each other, only generate a tilting moment between the pipes instead of shifting them in an axial direction relatively to each other. As a remedy, likewise on the side radially opposing the nose and the rising flank of the web, an axial force is transferred to the two pipes relatively to each other. Such an application of force can be introduced by the user via the lever if at least one of the two levers, preferably both however, tie opposite to the nose and the rising flank of the respective gripper.

Alternatively or supplementary thereto, on the first gripper more than one web and on the second gripper more than one interworking nose can be integrally moulded. In order that the noses all act simultaneously on respectively one web, the azimuthal angular spacing between the noses must be the same as that between the rising flanks. Decisive for the even effect of the force to shift the pipes in relation to each other at points that are spaced apart azimuthally is that the rise of the flanks of the webs are the same. Owing to these design features, for the axial transmission of force to the pipes from several points, besides twisting the grippers in relation to each other, no further action is required on the part of the user.

A preferred embodiment of the invention consists therein that the two grippers have essentially the same shape, i.e. that on each gripper a single web is integrally moulded that extends azimuthally. Of course, the webs are affixed to the respectively opposing grabbing arms. This ensures that the webs act upon the pipe from opposing directions. Furthermore, each gripper has a nose that extends radially. The nose bears against the azimuthally rising edge of the web of the other gripper. This embodiment allows symmetrical forces to be exercised upon the two grippers in order to separate the pipes.

An especially simple embodiment of the two grippers consists therein that they comprise one piece, i.e. are formed by a single component. In particular, it is proposed that the two grippers are a curved, treaded rod, which, for example, can be attached to the pipe with the aid of a tightening bolt affixed to the lever and lock nuts. The advantage consists therein that the threaded rod or the threaded clamp has a specific elasticity and adapts to the shape of the pipe when it is tightened with a clamping bolt. Furthermore, with the profiling of the threaded clamp a further structuring, as described further above, is achieved with the advantages described above. Alternatively, the grabbing arms can be embodied as a chain, which can be affixed to the pipe with a clamping device known to a person skilled in the art, which is fastened to the lever. The advantage consists therein that the chain can be adjusted to any pipe cross-section To facilitate the sliding of the nose along the rising flank of the web, i.e. to reduce the slippage resistance, it is proposed to provide the nose with rotatable rollers, balls or cylinders or other gliding devices. This can, for example, be a coating with a reduced sliding friction factor. In principle, it is also possible to provide the edge of the web with such gliding devices.

In order to be able to use the set on pipes with differing diameters, it is proposed to attach adapters for pipes of differing diameters on the radial inner sides of the grabbing arms. With these adapters, the width between the grabbing arms is reduced in order to be able to grip pipes of a smaller diameter. The embodiment of the adapters from different materials and also their affixation to the insides of the grabbing arms is possible for a person skilled in the art.

Further subject-matter of the invention is the use of the described set. The set is used in that the grabbing arms of the two grippers are fastened to respectively one pipe so that the nose of the second gripper is located in the axial region of the rising flank of the web disposed on the first gripper. The two grippers on the levers are twisted in relation to each other about the pipe axis so that the nose reaches a rising flank of the web and subsequently slides along it so that the two grippers move apart from each other by means of a transmission of force between the rising flank of the web and the nose in an anal direction.

Because the grabbing arms are affixed to the pipes, the movement of the grippers relatively to each other also moves the pipes, i.e. twisted relatively to each other and in an axial direction pulled part. This separates them. The grippers are preferably applied so that the nose of the second gripper is disposed only at a small azimuthal distance to a rising flank of the web so that before the nose acts upon the web the grippers only have to be twisted slightly in relation to each other.

BRIEF DESCRIPTION OF THE DRAWINGS FIGURES

Further details, features and advantages of the invention can be taken from the following description part in which with the aid of drawings typical embodiments of the invention are explained in greater detail. It shows in schematic representation FIG. 1 a connection between pipes to be separated, FIG. 2 a set applied to connected pipes, FIG. 3 the inventive set, FIGS. 4 and 5 clamping devices and FIG. 6 a quick reception device for exchangeable grabbing arms.

DETAILED DESCRIPTION OF THE DRAWING AND PREFERRED EMBODIMENTS

FIG. 1 shows a connection between two pipes (9*a,* 9*b*), which have been pushed together in a section along their mutual longitudinal axis. A circumferential seal (10) prevents gases or liquids transported in the pipes from escaping undesirably but makes it more difficult to pull apart the pipes axially across a longer axial stretch.

Figure 2:
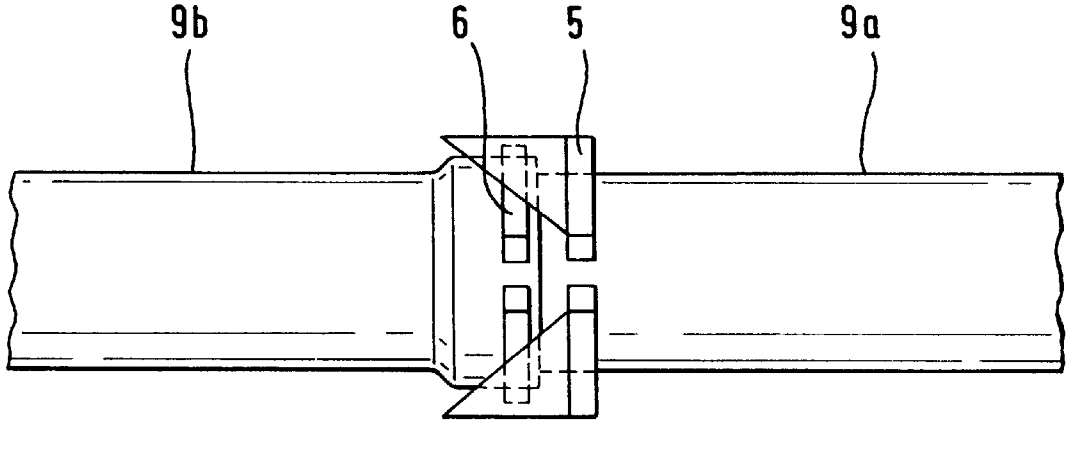
Figure 3:
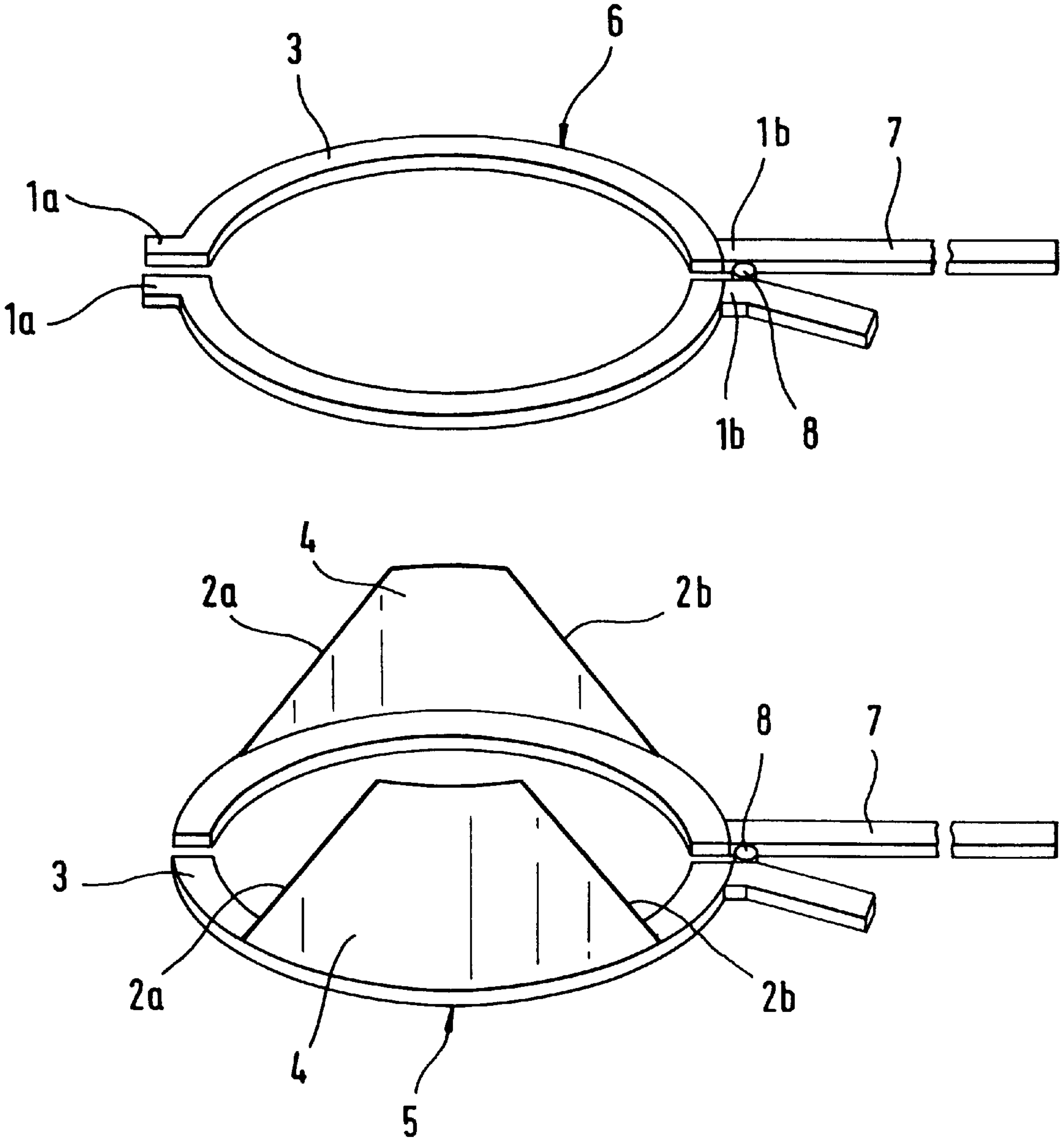

FIG. 2 shows the same pipes which have been pushed together (9*a*, 9*b*) in a side view. On each pipe (9*a* and 9*b*), one of the grippers (5 and 6) of the inventive set is applied FIG. 3 shows the inventive set in a perspective, exploded view. On both grabbing arms (3) of the first gripper (5), in an axial direction, respectively one web (4), which extends azimuthally, is integrally moulded. On one axial end facing away from grabbing arms (3), web (4) rises on both sides in respectively one flank ((2*a*, 2*b*) in an axial direction. To twist gripper (5), a lever (7) is attached to one of grabbing arms (3). The second gripper (6) contains, as does the first gripper (5), two grabbing arms (3) and is connected to a lever (7). Integrally moulded on both grabbing arms (3) are respectively two noses (1*a*, 1*b*).

Both grippers (5, 6) are used in that, as already shown in FIG. 2, they are clamped tightly via a clamping device (8) on respectively one pipe so that the webs of the gripper (5) point in the direction of the second gripper (6) and noses (1*a*, 1*b*) are located in the axial region of rising flank (2*a*, 2*b*). Now, the two grippers (5, 6) are twisted via respectively one lever (7) about the longitudinal axis of the axis in relation to each other, until noses (1*a*, 1*b*) act upon respectively one rising flank (2*a*, 2*b*) of the respective web. In the case of the embodiment of the invention shown here, because webs (4) rise from both sides, a rising flank is reached independently from the relative direction of rotation of the grippers. With continuation of the mutual twisting, noses (1*a*, 1*b*) glide along the respective rising flank (2*a* and 2*b*) so that the two grippers (5, 6), and thus the two pipes (9*a* and 9*b*), are pulled apart in an axial direction. Because respectively two noses (1*a*, 1*b*), radially opposed, act upon on rising flanks (2*a*, 2*b*), the axial force acts on both sides upon the pipes (9*a*, 9*b*) so that mutual misalignment, which could block the pulling apart of pipes (9*a*, 9*b*), is not to be expected. If the axial stretch travelled by gliding along rising flanks (2*a*, 2*b*) is insufficient for the complete separation of pipes (9*a*, 9*b*), grippers (5, 6) are to again be applied in the manner described and to be twisted.

In FIG. 4, a possible clamping device (8) is explained in greater detail. It is formed by a link (13), which connects the grabbing arms (3) to each other on the side facing away from lever (7), and a tightening bolt (14) via which the two grabbing arms (3) are tightened in relation to each other on the sides facing the lever (7) and simultaneously can be locked A different possible clamping device is shown in FIG. 5 It is formed by a (13), which connects the grippers (3) to each other on the side of the lever (7), and a limb (16). By pressing apart lever (7) and limb (16), which are connected rigidly to the respective grabbing arms (3), it is possible to tension the gripper. Lever (7) and limb (16) are disposed at an acute angle to each other, and to lock them relatively to each other, on lever (7) a roller (15) is disposed, which is moveable in a longitudinal direction and can travel along limb (16), and if moved in the direction of link (13) affixes grabbing arms (3) on the pipe by increasing the angle between lever (7) and tension lever (16).

In FIG. 6, a possibility is shown in a perspective, exploded view of bow a grabbing arm (3) can be affixed so as to be releasable on a clamping device. To that end, the clamping device is provided with an aperture (11) into which grabbing arm (3) penetrates and is fastened via a locking screw (12).

Overall, one obtains a set by means of which pipes which have been pushed together can be separated quickly by only one person and as a rule also without destroying the pipes.

What is claimed is:

1. Apparatus for separating cylindrical pipes pushed pipe into another in an axial direction, comprising:

a first gripper having two grabbing arms extending azimuthally, said first gripper further including a first clamping device and being connected a first lever having a first element extending in a perpendicular direction;

a web being affixed to said first gripper in an axial direction and extending azimuthally, said web being a rising flank in an azimthual region;

a second gripper having, at least, two grabbing arms and a second clamping device, said second gripper being connected to a second lever having a second element extending in a perpendicular direction; and, a nose on said second gripper extending radially thereto, said nose being disposed in an axial region of said rising flank of said web and projecting radially beyond said web.

2. The apparatus for separating cylindrical pipes pushed pipe into another in an axial direction according to claim 1, wherein said first clamping device includes a locking device.

3. The apparatus for separating cylindrical pipes pushed pipe into another in an axial direction according to claim 1, wherein said second clamping device includes a locking device.

4. The apparatus for separating cylindrical pipes pushed pipe into another in an axial direction according to claim 1, wherein a side on which said grabbing arms of said first gripper opens is opposite radially to said first lever.

5. The apparatus for separating cylindrical pipes pushed pipe into another in an axial direction according to claim 1, wherein a side on which said grabbing arms of said second gripper opens is opposite radially to said second lever.

6. The apparatus for separating cylindrical pipes pushed pipe into another in an axial direction according to claim 1, wherein said clamping device of said first gripper includes an additional movable limb opposite said first lever.

7. The apparatus for separating cylindrical pipes pushed pipe into another in an axial direction according to claim 1, wherein said clamping device of said second gripper includes an additional movable limb opposite said second lever.

8. The apparatus for separating cylindrical pipes pushed pipe into another in an axial direction according to claim 1, wherein said clamping device of said first gripper includes a clamping bolt for applying a clamping force to said grabbing arms of said first gripper.

9. The apparatus for separating cylindrical pipes pushed pipe into another in an axial direction according to claim 1, wherein said clamping device of said second gripper includes a clamping bolt for applying a clamping force to said grabbing arms of said second gripper.

10. The apparatus for separating cylindrical pipes pushed pipe into another in an axial direction according to claim 1, wherein said clamping device of said first gripper applies a clamping force to said gripping arms of said first gripper.

11. The apparatus for separating cylindrical pipes pushed pipe into another in an axial direction according to claim 1, wherein said clamping device of said second gripper applies a clamping force to said gripping arms of said second gripper.

12. The apparatus for separating cylindrical pipes pushed pipe into another in an axial direction according to claim 1, wherein said grabbing arms of said first gripper are releasably connected to said clamping device of said first gripper.

13. The apparatus for separating cylindrical pipes pushed pipe into another in an axial direction according to claim 1, wherein said grabbing arms of said second gripper are releasably connected to said clamping device of said second gripper.

14. The apparatus for separating cylindrical pipes pushed pipe into another in an axial direction according to claim 1, wherein said first lever is connected to said first gripper and said second lever is connected to said second gripper so that when said nose bears against said rising flank of said web, said first lever and said second lever both extend in substantially the same direction.

15. The apparatus for separating cylindrical pipes pushed pipe into another in an axial direction according to claim 1, wherein said first lever lies opposite to said rising flank of said web and said second lever lies opposite said nose.

16. The apparatus for separating cylindrical pipes pushed pipe into another in an axial direction according to claim 1, wherein said second lever lies opposite to said rising flank of said web and said first lever lies opposite said nose.

17. The apparatus for separating cylindrical pipes pushed pipe into another in an axial direction according to claim 1, wherein said first gripper and said second gripper have substantially the same mirror-inverted shape.

18. The apparatus for separating cylindrical pipes pushed pipe into another in an axial direction according to claim 1, wherein said nose, bearing against said rising flank of said web, is provided with a sliding element.

19. The apparatus for separating cylindrical pipes pushed pipe into another in an axial direction according to claim 1, wherein said nose, bearing against said rising flank of said web, is provided with a rotatable rolling element.

20. The apparatus for separating cylindrical pipes pushed pipe into another in an axial direction according to claim 1, wherein said grabbing arms of said first gripper and second gripper are provided with means for adapting said grabbing arms to pipes of varying inner side diameters.

* * * * *